United States Patent
Shin

(10) Patent No.: US 8,698,041 B2
(45) Date of Patent: *Apr. 15, 2014

(54) LASER ASSISTED MACHINING APPARATUS WITH DISTRIBUTED LASERS

(75) Inventor: Yung Shin, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 89 days.

This patent is subject to a terminal disclaimer.

(21) Appl. No.: 13/227,920

(22) Filed: Sep. 8, 2011

(65) Prior Publication Data

US 2012/0024827 A1 Feb. 2, 2012

Related U.S. Application Data

(63) Continuation of application No. 11/517,543, filed on Sep. 7, 2006, now Pat. No. 8,053,705.

(60) Provisional application No. 60/714,799, filed on Sep. 7, 2005.

(51) Int. Cl.
  *B23P 25/00* (2006.01)
  *B23K 26/00* (2006.01)
  *B23K 26/08* (2014.01)

(52) U.S. Cl.
  CPC .......... *B23P 25/006* (2013.01); *B23K 26/0823* (2013.01)
  USPC ................................ 219/121.76; 219/121.72

(58) Field of Classification Search
  USPC ............. 219/121.76, 121.67, 121.72, 121.62, 219/121.83, 121.68, 121.69, 121.85; 409/132, 137, 216
  See application file for complete search history.

(56) References Cited

U.S. PATENT DOCUMENTS

| | | | |
|---|---|---|---|
| 2,600,453 A | | 6/1952 | Weingart |
| 2,654,821 A | | 10/1953 | Gillett |
| 3,587,367 A | | 6/1971 | Dotson |
| 4,229,640 A | * | 10/1980 | Castellani Longo ..... 219/121.69 |
| 4,352,973 A | | 10/1982 | Chase |
| 4,356,376 A | | 10/1982 | Komanduri et al. |
| 4,459,458 A | | 7/1984 | Vetsch et al. |
| 4,625,093 A | * | 11/1986 | Chryssolouris .......... 219/121.69 |

(Continued)

FOREIGN PATENT DOCUMENTS

| EP | 985485 A1 | * | 3/2000 |
|---|---|---|---|
| GB | 2175737 A | * | 12/1986 |

(Continued)

OTHER PUBLICATIONS

Lei, S. et al., "Deformation Mechanisms and Constitutive Modeling for Silicon Nitride Undergoing Laser-Assisted Machining," *International Journal of Machine Tools & Manufacture*, vol. 40, No. 15, Dec. 2000, pp. 2213-2233.

(Continued)

*Primary Examiner* — Geoffrey S Evans
(74) *Attorney, Agent, or Firm* — Hartman Global IP Law; Gary M. Hartman; Domenica N. S. Hartman

(57) ABSTRACT

Laser assisted machining process and machine utilizing multiple distributed laser units that are strategically distributed around the workpiece being machined to simultaneously heat the workpiece, creating a desired temperature distribution for laser assisted machining. Sequential incremental heating from different directions and positions are used, resulting in longer tool life and shorter machining time.

9 Claims, 2 Drawing Sheets

(56) References Cited

U.S. PATENT DOCUMENTS

| | | | |
|---|---|---|---|
| 4,733,049 | A | 3/1988 | Lemelson |
| 4,749,840 | A | 6/1988 | Piwczyk |
| 4,857,697 | A | 8/1989 | Melville |
| 4,925,523 | A | 5/1990 | Braren et al. |
| 5,256,851 | A | 10/1993 | Presby |
| 5,698,121 | A | 12/1997 | Kosaka et al. |
| 5,837,960 | A | 11/1998 | Lewis et al. |
| 5,849,371 | A | 12/1998 | Beesley |
| 5,859,405 | A | 1/1999 | Golz et al. |
| 5,906,459 | A | 5/1999 | Thomas et al. |
| 6,122,564 | A | 9/2000 | Koch et al. |
| 6,218,642 | B1 | 4/2001 | Christmas et al. |
| 6,391,251 | B1 | 5/2002 | Keicher et al. |
| 6,393,687 | B1 | 5/2002 | Friedrich |
| 6,410,105 | B1 | 6/2002 | Mazumder et al. |
| 6,653,210 | B2 | 11/2003 | Choo et al. |
| 6,666,630 | B2 | 12/2003 | Zimmermann et al. |
| 6,811,744 | B2 | 11/2004 | Keicher et al. |
| 6,859,681 | B1 | 2/2005 | Alexander |
| 7,002,100 | B2 | 2/2006 | Wu et al. |
| 8,053,705 | B2 * | 11/2011 | Shin .................. 219/121.76 |
| 2003/0059268 | A1 * | 3/2003 | Zimmermann et al. ...... 409/132 |
| 2003/0066822 | A1 | 4/2003 | Kusnezow |
| 2004/0104207 | A1 * | 6/2004 | Wu et al. ................ 219/121.73 |
| 2004/0173590 | A1 | 9/2004 | Hata et al. |
| 2004/0206734 | A1 | 10/2004 | Horsting |
| 2005/0006361 | A1 | 1/2005 | Kobayashi et al. |
| 2013/0134141 | A1 * | 5/2013 | Santner et al. .......... 219/121.72 |

FOREIGN PATENT DOCUMENTS

| | | | |
|---|---|---|---|
| JP | 6-186435 | A * | 7/1994 |
| JP | 11-86734 | A * | 3/1999 |
| SU | 1576237 | A * | 7/1990 |

OTHER PUBLICATIONS

Lei, S. et al., "Experimental Investigation of Thermo-Mechanical Characteristics in Laser-Assisted Machining of Silicon Nitride Ceramics," *Journal of Manufacturing Science and Engineering*, vol. 123, Nov. 2001, pp. 639-646.

Pfefferkorn, F. et al., "Laser-Assisted Machining of Magnesia-Partially-Stabilized Zirconia," *Journal of Manufacturing Science and Engineering*, vol. 126, Issue 1, Feb. 2004, pp. 42-51.

Rebro, P. A. et al., "Design of Operating Conditions for Crackfree Laser-Assisted Machining of Mullite," *International Journal of Machine Tools & Manufacture*, vol. 44, No. 7-8, Jun. 2004, pp. 677-694.

Rebro, P. A. et al., "Laser-Assisted Machining of Reaction Sintered Mullite Ceramics," *Journal of Manufacturing Science and Engineering*, vol. 124, Nov. 2002, pp. 875-885.

Rebro, P.A. et al., "Comparative Assessment of Laser-Assisted Machining for Various Ceramics," *30th North American Manufacturing Research Conference*, May 21-24, 2002, West Lafayette, Indiana, 10 pgs.

Rozzi, J. C. et al., "Experimental Evaluation of the Laser Assisted Machining of Silicon Nitride Ceramics," *Journal of Manufacturing Science and Engineering*, vol. 122, No. 4, Nov. 2000, pp. 666-670.

Rozzi, J. C. et al., "Transient, Three-Dimensional Heat Transfer Model for the Laser Assisted Machining of Silicon Nitride: I. Comparison of Predictions With Measured Surface Temperature Histories," *International Journal of Heat and Mass Transfer*, vol. 43, No. 8, Apr. 15, 2000, pp. 1409-1424.

Shin, Y. C. et al., "Laser-Assisted Machining: Its Potential and Future," *Machining Technology*, vol. 11, No. 3, Third Quarter 2000, pp. 1-7.

Zhang, C. et al., "A Novel Laser-Assisted Truing and Dressing Technique for Vitrified CBN Wheels," *International Journal of Machine Tools and Manufacture*, vol. 42, No. 7, May 2002, pp. 825-835.

"Laser Aided Manufacturing Processes Lab," [online], © 2003, University of Missouri-Rolla. Retrieved from the Internet: http://web.mst.edu/~lamp/.

"Laser Aided Material Deposition Process," [online], © 2003, University of Missouri-Rolla. Retrieved from the Internet: http://web.mst.edu/~lamp/laserprocess.shtml.

Kincade, K., untitled, LaserFocusWorld, c. May 2005, 5 pages.

* cited by examiner

US 8,698,041 B2

LASER ASSISTED MACHINING APPARATUS WITH DISTRIBUTED LASERS

CROSS-REFERENCE TO RELATED APPLICATIONS

This application is a continuation of patent application Ser. No. 11/517,543, filed Sep. 7, 2006, now U.S. Pat. No. 8,053,705, which claims the benefit of U.S. Provisional Patent Application No. 60/714,799, filed Sep. 7, 2005, which applications are hereby incorporated by reference.

GOVERNMENT RIGHTS

This invention was made with government support under Contract/Grant No. DMI-0115172 awarded by the National Science Foundation. The government has certain rights in the invention.

TECHNICAL FIELD OF THE INVENTION

The present invention relates generally to laser assisted machining and, more particularly, to systems and processes that utilize multiple laser units to assist in machining a turning workpiece.

BACKGROUND OF THE INVENTION

Laser assisted machining is based upon the idea that the strength of materials generally decreases at elevated temperatures, and has been in use since the late 1970s when lasers became a viable heat source capable of producing intense heat in a very precise region. Laser assisted machining typically involves using a high power laser as a heat source to soften workpiece material ahead of a cutting tool in a lathe or milling machine, for example, to facilitate material removal and prolong tool life. FIG. 1 is a diagram of a typical laser assisted turning operation 10 utilizing a laser unit 12 to soften a workpiece 14 with a single laser spot 16 that locally elevates the temperature of the material before it is removed with a conventional cutting tool 18.

Due to inefficiencies associated with laser-metal interactions and high initial startup costs, economic justification for laser assisted machining of metals was not achieved, and interest in laser assisted machining was diverted to other areas of research. However, continued improvements in lasers, such as higher power Nd:Yag lasers and solid state diode lasers, have provided potential for improvements in laser assisted machining of metals. The present invention involves the use of multiple distributed lasers to assist in the machining of materials, such as ceramics, high temperature alloys, and composites, for example, which are typically difficult to machine.

SUMMARY OF THE INVENTION

This invention is a laser assisted machining (LAM) apparatus including a lathe having a workpiece holder that rotates about an axis and a cutting tool holder that moves along a path parallel to the rotational axis of the workpiece holder, and first and second laser units configured to emit respective first and second laser beams with defined targeting, the LAM apparatus in certain embodiments including control means for independently controlling output of each of the laser units.

The objects and advantages of the present invention will be more apparent upon reading the following detailed description in conjunction with the accompanying drawings.

DETAILED DESCRIPTION OF THE PREFERRED EMBODIMENTS

Figure 1:
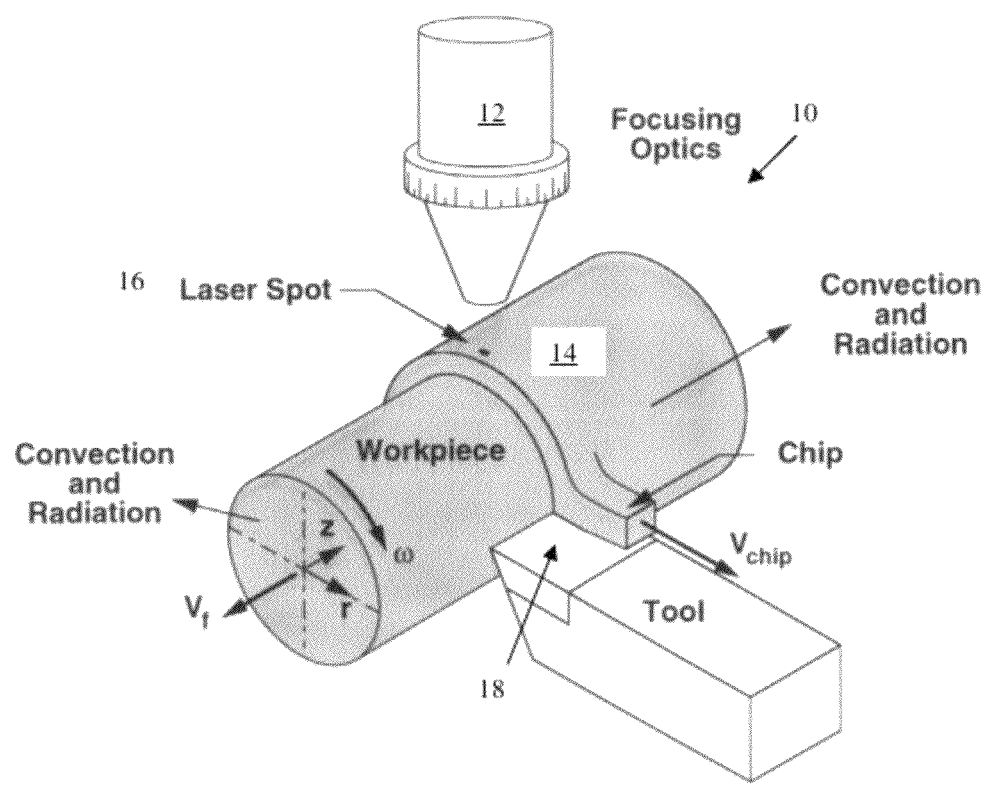
FIG. 1 is a diagram of a typical prior art laser assisted turning operation.

For the purpose of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates.

Figure 2:
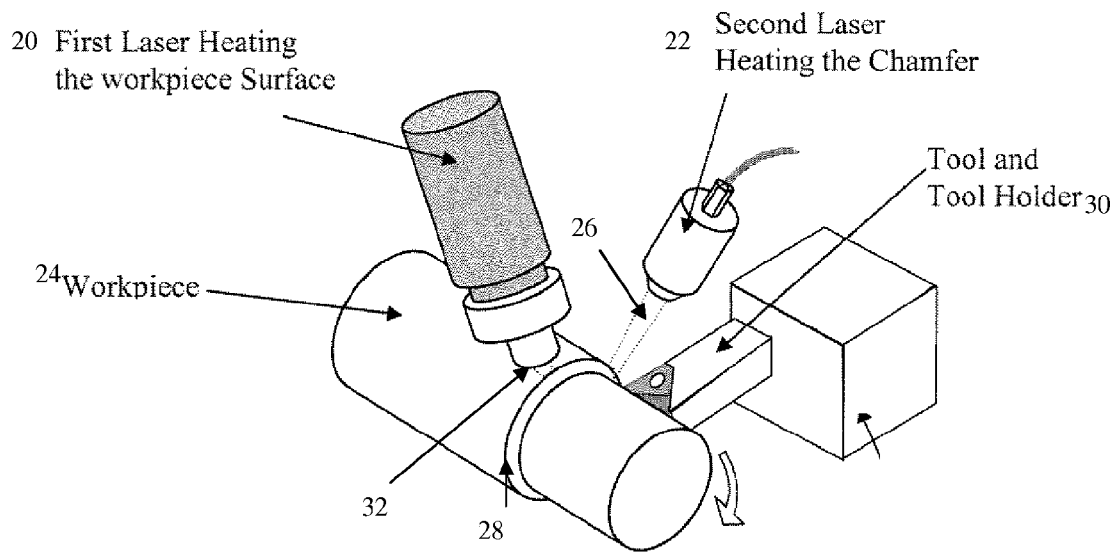
FIG. 2 is a diagram of a laser assisted turning process utilizing multiple distributed lasers according to one embodiment of the present invention.

One aspect of the present invention involves a turning process utilizing multiple distributed lasers to assist a cutting tool in machining a workpiece. FIG. 2 shows that laser units 20 and 22 are strategically positioned around workpiece 24 so that a desired temperature distribution that assists in the removal of material can be created within the workpiece. Laser beam 26 provided by laser unit 22 heats the chamfer 28 of the workpiece prior to cutting tool 30 removing material, while laser beam 32 provided by laser unit 20 heats the workpiece surface ahead of laser beam 26.

The multiple laser beams 26 and 32 provide sequential incremental heating from different directions and positions such that only the material zone to be removed reaches the temperature conducive to machining, while the remaining bulk material is relatively unaffected. Furthermore, sequential heating can generate surface treatment effects, which can improve absorptivity for the following laser beams, thereby significantly improving energy efficiency for the laser assisted machining of materials with high reflectivity such as metals.

Figure 3:
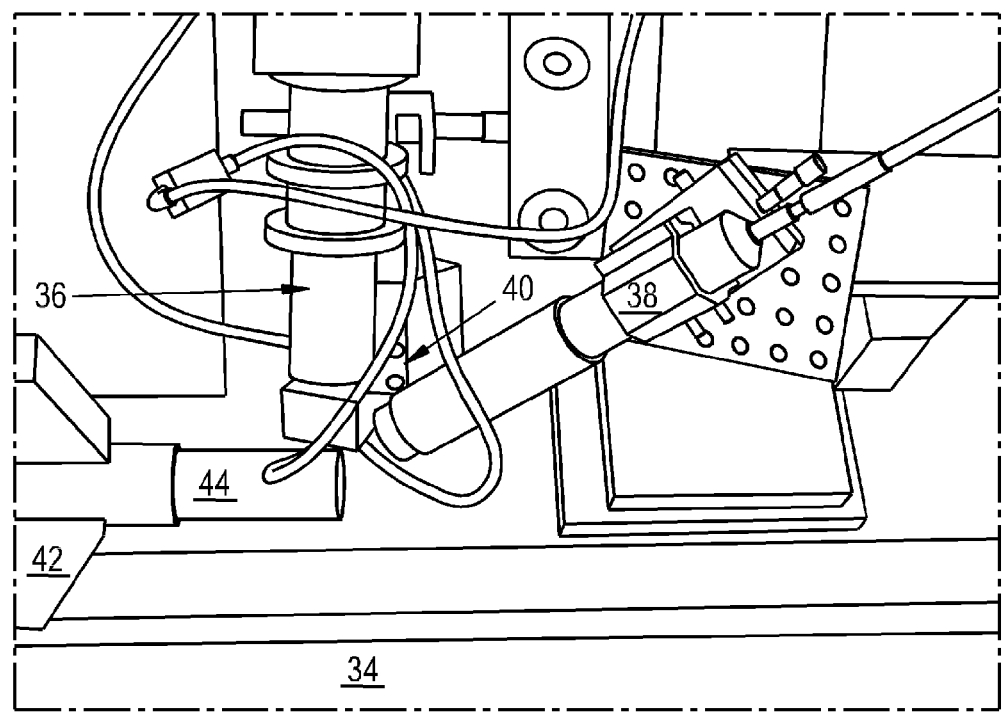
FIG. 3 shows a lathe with multiple distributed lasers for performing laser assisted turning operations according to another embodiment of the present invention.

Another aspect of the present invention involves a lathe with multiple distributed lasers for performing laser assisted turning operations. One embodiment of the lathe, used in turning austenitic stainless steel P550, is shown in FIG. 3. The lathe shown, 34, is a 60 hp Jones and Lambson turret lathe equipped with a NUM 1060 controller. The two laser units shown, 38 and 36, are a 500 W Nd:Yag laser and a 1.5 kW $CO_2$ laser, respectively.

Laser units 36 and 38 in the embodiment shown are connected to the cutting tool holder 40 of the lathe 34 so that they jointly translate with the cutting tool (not shown) as the cutting tool holder 40 moves along a path parallel to the rotational axis of the workpiece holder 42. Laser unit 38 is positioned about 10-13 degrees circumferentially ahead of the cutting tool, and laser unit 36 is positioned about 55 degrees circumferentially ahead of the cutting tool. Utilizing two independently controlled laser units allows more precise control over temperature gradients within the workpiece 44, avoids undesirable subsurface thermal damage, prevents microstructural change in the workpiece, and improves overall energy efficiency of the laser assisted machining process.

Laser assisted turning operations using the embodiment of the lathe shown in FIG. 3 resulted in a decrease in the overall time required to machine an austenitic stainless steel P550 workpiece 44 by 20-50% when compared with both carbide and conventional ceramic machining due to the higher machining speeds and longer tool life. The shorter machining times resulted in an estimated economic savings of 20-50%, when taking into account additional costs associated with operating and maintaining the laser units.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A laser assisted machining apparatus, comprising:
    a lathe having a workpiece holder that spins about a rotational axis and a cutting tool holder that moves along a path parallel to the rotational axis of the workpiece holder;
    a first laser unit that translates with the cutting tool holder along the path so as to emit a first laser beam at a power output and impinging upon a workpiece in the workpiece holder at a circumferential position about the rotational axis that is substantially ahead of a circumferential position of a cutting tool in the cutting tool holder; and
    a second laser unit that translates with the cutting tool holder along the path so as to emit a second laser beam at a power output and impinging upon the workpiece from an axial position behind the cutting tool relative to its travel direction along the path, and at a circumferential position close to and ahead of the circumferential position of the cutting tool and substantially behind the circumferential position of the first laser beam on the workpiece;
    wherein the power outputs of the first and second laser beams are independently controlled relative to each other.

2. The laser assisted machining apparatus of claim 1, wherein the second laser unit is arranged such that the second laser beam impinges substantially perpendicularly upon a chamfer formed on the workpiece by the cutting tool.

3. The laser assisted machining apparatus of claim 1, wherein the first laser beam impinges upon the workpiece at an axial position which is axially ahead of the cutting tool relative to a travel direction thereof along the path.

4. The laser assisted machining apparatus of claim 1, wherein the circumferential position of the first laser beam is greater than 45 degrees circumferentially ahead of the cutting tool, and the circumferential position of the second laser beam is less than 15 degrees circumferentially ahead of the cutting tool.

5. A laser assisted machining apparatus utilizing multiple distributed lasers to assist a cutting tool in machining a rotating workpiece, the apparatus comprising:
    a cutting tool configured to cut material from the rotating workpiece, thereby creating a circumferential chamfer on the rotating workpiece; and
    first and second laser units configured to sequentially, incrementally heat a radially outer portion of the rotating workpiece prior to the cutting tool beginning to remove the radially outer portion, the radially outer portion including part of a surface of the circumferential chamfer, the first laser unit being configured to preheat the radially outer portion by directing a first laser beam onto the surface of the circumferential chamfer at a circumferential position about the rotational axis of the rotating workpiece that is substantially ahead of a circumferential position of the cutting tool about the rotational axis of the rotating workpiece, the second laser unit being configured to further heat the radially outer portion by directing a second laser beam onto the surface of the circumferential chamfer at an angle thereto at a circumferential position in close proximity to the circumferential position of the cutting tool.

6. The laser assisted machining apparatus of claim 5, wherein the apparatus is configured to independently control power outputs of the first and second laser units and control temperature gradients within the workpiece.

7. A laser assisted machining apparatus utilizing multiple distributed lasers to assist a cutting tool in machining a rotating workpiece, the apparatus comprising:
    a first laser unit configured to heat the rotating workpiece with a first laser beam directed onto the workpiece at a first point axially ahead of the cutting tool relative to a travel direction thereof on the rotating workpiece, and substantially circumferentially ahead of the cutting tool; and
    a second laser unit configured to heat the rotating workpiece with a second laser beam directed onto the workpiece at a second point axially even with the cutting tool and on a chamfer of the workpiece, and circumferentially ahead of the cutting tool and substantially behind the first point;
    whereby material on the rotating workpiece is sequentially heated by the first and second laser beams and then cut by the cutting tool;
    wherein power outputs of the first and second laser units are independently controlled to control temperature gradients within the workpiece.

8. A laser assisted machining apparatus utilizing multiple distributed lasers to assist a cutting tool in machining a rotating workpiece, the apparatus comprising:
    a cutting tool configured to cut material from the rotating workpiece tool, thereby creating a chamfer on the rotating workpiece;
    a first laser unit configured to heat the workpiece at a first point circumferentially ahead of the cutting tool; and
    a second laser unit configured to heat the chamfer at a second point, circumferentially behind the first point and ahead of the cutting tool, thereby sequentially incrementally heating the rotating workpiece;
    wherein the first laser unit comprises a higher-power laser than the second laser unit.

9. The laser assisted machining apparatus of claim 8, wherein the apparatus is configured to independently control power outputs of the first and second laser units and control temperature gradients within the workpiece.

* * * * *